United States Patent
Arnold et al.

(10) Patent No.: US 8,036,530 B2
(45) Date of Patent: Oct. 11, 2011

(54) METHOD AND SYSTEM FOR TRANSPORTING DOCSIS COMMUNICATION SIGNALS OVER A PASSIVE OPTICAL NETWORK

(75) Inventors: Erich Arnold, Naperville, IL (US); Jeff Howe, West Chicago, IL (US); Thomas Cloonan, Lisle, IL (US); Mike Emmendorfer, Chesterfield, MO (US)

(73) Assignee: ARRIS Group, Inc., Suwanee, GA (US)

(*) Notice: Subject to any disclaimer, the term of this patent is extended or adjusted under 35 U.S.C. 154(b) by 816 days.

(21) Appl. No.: 12/052,701

(22) Filed: Mar. 20, 2008

(65) Prior Publication Data

US 2008/0232801 A1 Sep. 25, 2008

Related U.S. Application Data

(60) Provisional application No. 60/895,935, filed on Mar. 20, 2007.

(51) Int. Cl.
*H04B 10/20* (2006.01)
(52) U.S. Cl. ............... 398/58; 398/66; 398/70
(58) Field of Classification Search ............ 398/58, 398/63, 66–72
See application file for complete search history.

(56) References Cited

U.S. PATENT DOCUMENTS

| 7,483,632 B2* | 1/2009 | Sung et al. ............ 398/63 |
| 2005/0025165 A1* | 2/2005 | Lee et al. ............ 370/401 |
| 2007/0214270 A1* | 9/2007 | Absillis ............ 709/227 |
| 2008/0101793 A1* | 5/2008 | Koch et al. ............ 398/1 |
| 2009/0175276 A1* | 7/2009 | Tsuge et al. ............ 370/392 |
| 2010/0241748 A1* | 9/2010 | Ansari et al. ............ 709/225 |

\* cited by examiner

*Primary Examiner* — Dzung Tran
(74) *Attorney, Agent, or Firm* — Troy A. Van Aacken; Robert J. Starr

(57) ABSTRACT

A translation agent adapts DOCSIS information, primarily QoS information, for transmission over a PON. The agent places into an IP address field of a DHCP message the MAC address of an ONU associated with a CPE device attempting to register with a CMTS. The translation agent intercepts DHCP reply messages from the DHCP server using the MAC address of the ONU. The translation agent extracts information, including an IP address of the client CPE assigned by the DHCP server. The agent downloads a configuration file for the CPE device using the configuration filename and configuration file server contained in a DHCP reply message. Information contained in the configuration file is converted from content in a format used by DOCSIS, to content in a format used by PON devices. The translated content includes QoS parameters, functions related to which are controlled at the ONU by an OLT coupled to the CMTS.

5 Claims, 3 Drawing Sheets

METHOD AND SYSTEM FOR TRANSPORTING DOCSIS COMMUNICATION SIGNALS OVER A PASSIVE OPTICAL NETWORK

CROSS REFERENCE TO RELATED APPLICATION

This application claims priority under 35 U.S.C. 119(e) to the benefit of the filing date of Arnold, U.S. provisional patent application No. 60/895,935 entitled "A DOCSIS CMTS control interface to an Ethernet passive optical network," which was filed Mar. 20, 2007, and is incorporated herein by reference in its entirety.

FIELD OF THE INVENTION

This invention relates, generally, to network communication devices, and, more particularly to providing DOCSIS broadband service over a passive optical network.

BACKGROUND

A cable network system operator, often referred to as a multiple systems operator ("MSO") typically provides data and telephony services over a cable modem or telephony modem that operates according to the Data Over Cable Service Interface Specification ("DOCSIS") standard and the PacketCable standard for telephony service. DOCSIS anticipates that communication signals are sent over a hybrid fiber coaxial cable network ("HFC") in the downstream direction from a cable modem termination system at an MSO-operated head end to a cable modem ("CM"), or a telephony modem, such as, for example, a TOUCHSTONE™ Telephony Modem ("TTM") sold by ARRIS Group, Inc. The HFC also transports communication signals in the upstream direction from the CM, or TTM, towards the CMTS. The cable industry originally envisioned that DOCSIS equipment would carry data traffic and PacketCable would facilitate telephony traffic over the HFC network. While both types of traffic have special considerations unique to them, an HFC network, which also carries standard television signals to a subscriber, was deemed sufficient to carry the data, voice and television video traffic.

Turning now to the drawings, FIG. 1 illustrates a system 2 for providing DOCSIS communication traffic signals over an HFC network 4. HFC 4 carries traffic signals between CMTS 6 and user devices 8, at a plurality of locations, examples of the user devices being cable modems and/or telephony modems. CMTS 6 communicates over private IP network 10 with myriad devices, as well as the internet backbone, typically according to a protocol such as Ethernet. The various devices that communicate with CMTS 6 via IP network 10 include a video server 12, call management server ("CMS") 14, billing server 16 and configuration server 18. It will be appreciated that the various servers include processing components and database components. For example, configuration server 18 includes a configuration table, or database 20 and a processor/interface 22 that, for example, processes connection requests from modems 8 and sends configuration files from server 20 that are associated with the requesting modem thereto based on the modem's address. The address could be an IP address, but is typically a media access control ("MAC") layer address.

As more and more consumers desire high definition ("HD") video service, and MSO provide more and more content in HD, the traffic-carrying capacity of an HFC is strained and actually poses a limitation on the amount of the high-bandwidth-need traffic signals that can be delivered from a head end to consumers.

Thus, MSOs have begun to seek ways to obtain higher capacity than an HFC provides. MSOs are increasingly interested in using passive optical network ("PON") to carry content, including data, voice and video, but they want to minimize investment in equipment. Thus, many MSOs wish to use much of their existing equipment, such as call management servers, billing servers, configuration servers, etc., that couple to the CMTS via a private internet protocol ("IP") network, and even the CMTS itself.

Although DOCSIS traffic can be carried over a PON, a PON and DOCSIS use different protocols, control messages and addressing methods for sending a data packet from one location to another. Thus, there is a need in the art for a method and system that allows an MSO to continue to use existing head end equipment to send and receive DOCSIS traffic of a PON instead of over an HFC.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
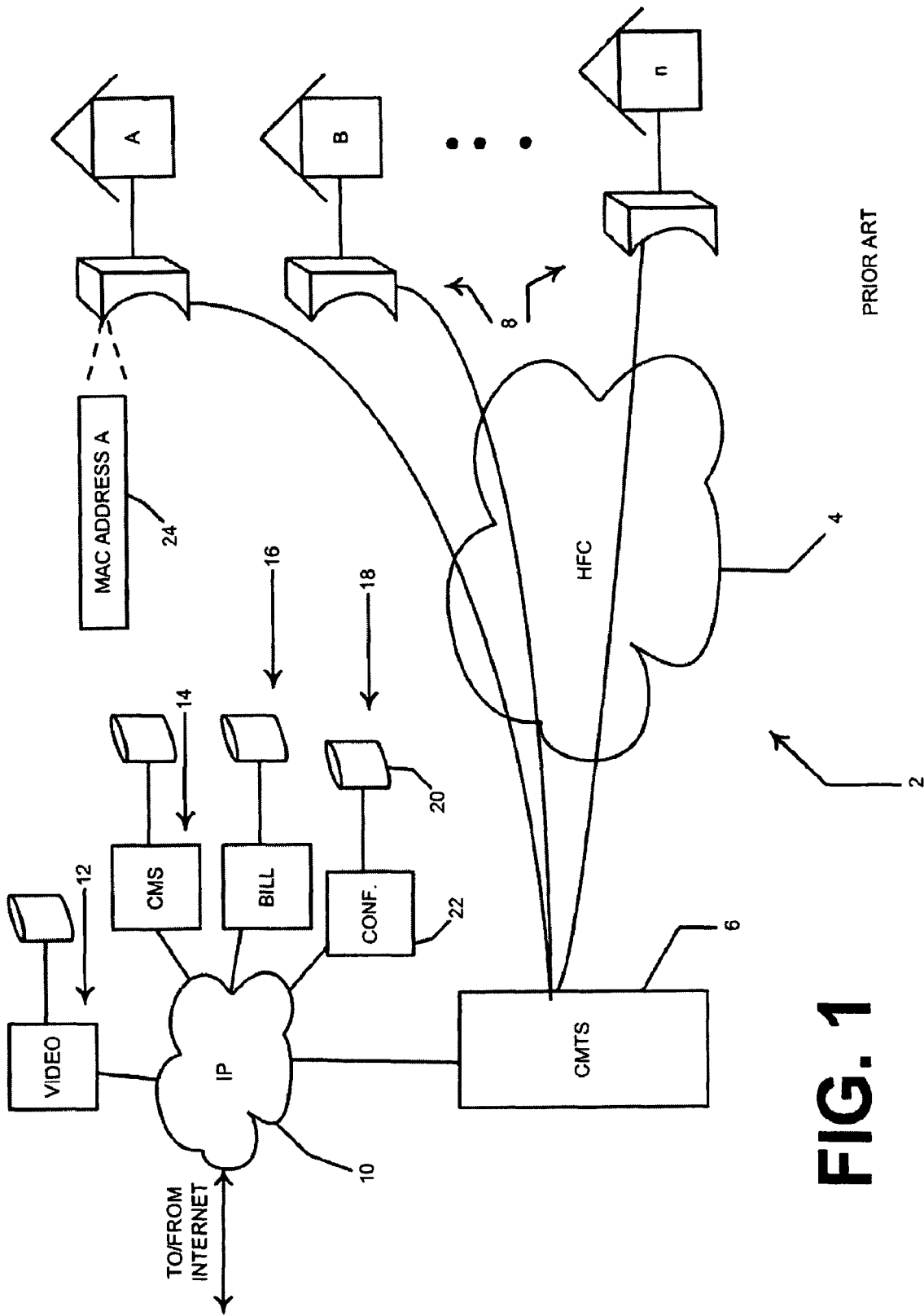
FIG. 1 illustrates a system for transporting DOCSIS signals over an HFC network.
Figure 2:
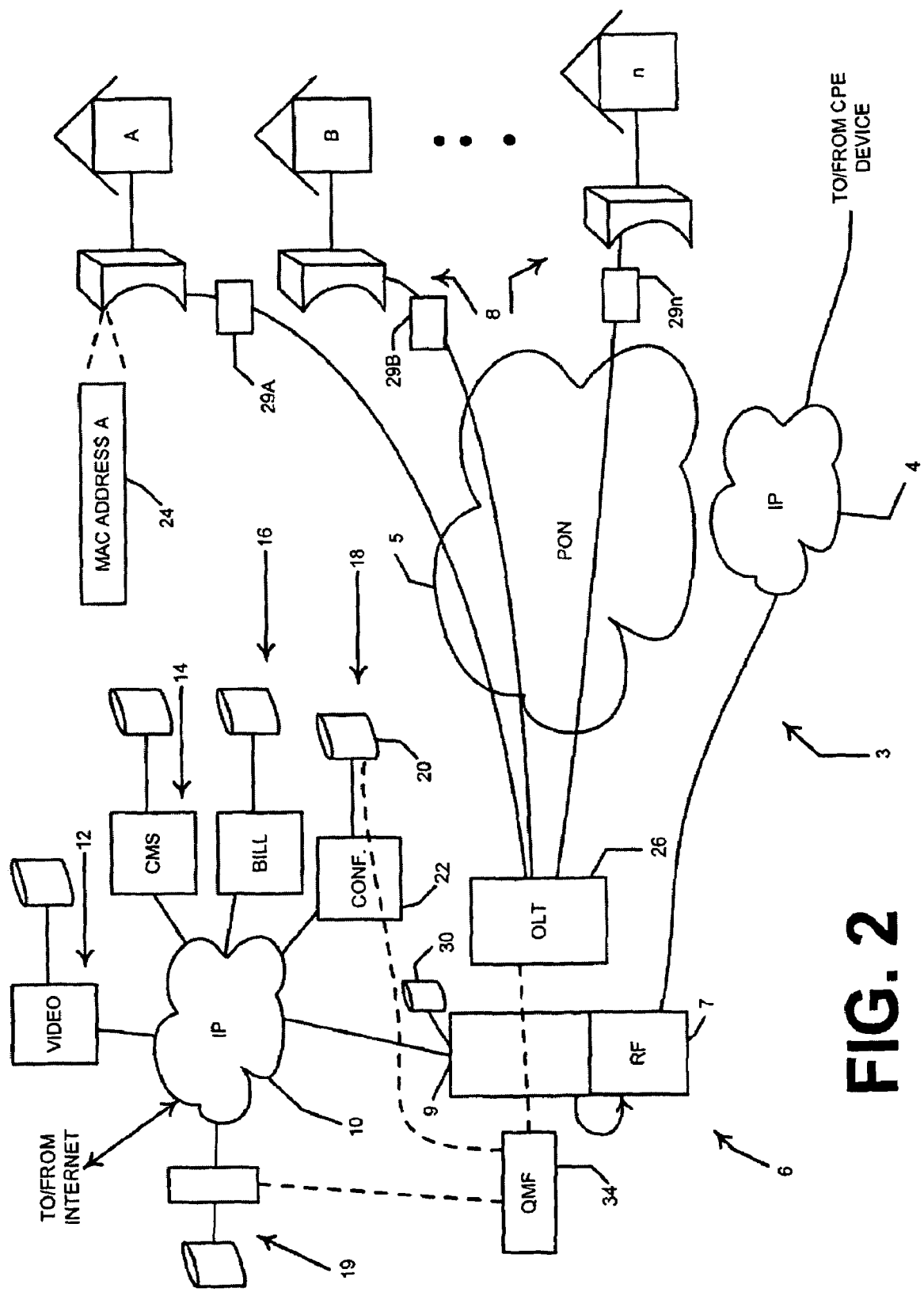
FIG. 2 illustrates a system for transporting DOCSIS communication signals over a PON.

Turning now to FIG. 2, the figure illustrates a system 3 for transporting DOCSIS signals over a mixed PON/HFC network 5 rather than a pure HFC network 4 of FIG. 1. System 3 is similar to system 2, except system 3 also includes a few additional components such as an optical line terminal ("OLT") 26 and a plurality of optical network units ("ONU") 29 that correspond to user devices 8. It will be appreciated that HFC 4, as illustrated in FIG. 1, may also be coupled to CMTS 6. Moreover, CMTS may be thought of comprising two sections, an RF section 7 that couples to higher level processing section 9. As in a typical CMTS, the switching fabric of CMTS 6 serves multiple CMTS MAC domains in the CMTS. These higher level portions are included in high level processing section 9. Each MAC domain in processing section 9 may serve RF QAM modulators in RF portion 7 that couple to CPE devices 28 according to DOCSIS over HFC 4. Each MAC domain may also serve OLTs 26 that couple to ONUs 29 according to PON standards over PON 5. Server 30 coupled to CMTS 6 includes an agent that performs various functions that facilitate transporting DOCSIS over PON 5. Thus, processing portion 9 couples to an operator's private IP network 10 and can process signals, service flows, traffic, etc., to either one or more OLTs 26, or one or more QAM modulators in RF section 7.

As discussed above, configuration server 22 typically forwards a configuration file associated with a requesting device 8 that is requesting service to that device based on the device's MAC address. However, since OLT's do not communicate with ONUs over PON 5 the way a CMTS does with CPE devices 8 over an HFC, an agent operating on processor portion 9 of CMTS 6 performs various processing and conversion of DOCSIS data so that it can be transported over the PON.

More specifically, a configuration file in server 18 contains bandwidth parameters, for example, for a particular CM. These parameters may be referred to as Quality of Service ("QoS") parameters that are stored in a particular DOCSIS format, which differs from the format that PON uses for similar parameters. An agent 34, which may be referred to herein as a QoS Mapping Function, or ("QMF"), translates information from the configuration server 18 to a format that can be sent over PON 5 and that one of registering ONUs 29 A-n will recognize and can respond to. QMF agent 34 includes a software application that operates on processor portion 9 of CMTS 6 and processes management messages via SNMP with a management server 19 coupled to IP network 10. QMF agent 34 also communicates with server 18 as discussed above. When communicating with server 19, QMF 34 performs SNMP proxy agent functionality, such as translating QoS values for given parameters back and forth between DOCSIS and PON formats. When communicating with server 18, QMF agent 34 acts as a proxy client for the CPE device attempting to register, as discussed in greater detail below. In other words, QMF 34 appears to server 18 as a CPE device, and thus as a proxy client therefore. Since an ONU typically does not have an IP address, which is data that is used to communicate set-up information to a CPE device attempting to register, the QMF agent 34 operates in the place of the CPE in receiving setup information destined for a CPE device. Also, QMF agent 34 may also modify some DOCSIS information that is either not required for operation over PON, that should be a different value for operation over PON, or that needs to be in a different format for operation over PON. For example, a configuration file for a DOCSIS device may contain information related to the RF frequency and modulation a CPE should tune to. Since an ONU does not transport information over an RF channel, these data are not used when transporting DOCSIS information over PON. Similarly, PON does not use MPEG encoding so information related thereto can be removed from the configuration file sent from server 18.

When an ONU 29 ranges and registers with OLT 26, the OLT sends a report via a logical control interface to QMF agent 34 that identifies the MAC address of the ONU that is coming online and requires QoS configuration. QMF 34, acting as a proxy for ONU 29, sends a DHCP Discover and Request message sequence to the DHCP server (via a DHCP Relay Agent) using the ONU's MAC address as the client address. The DHCP server responds to QMF 34 with a reply message that contains an IP configuration based on the MAC address of ONU 29. The DHCP server interprets a CM configuration request and an ONU configuration request sent by proxy from QMF 34 as being from the same device.

The DHCP configuration file received by QMF 34 includes a management IP address for ONU 29. QMF 34 retains the ONU's IP address, but does not transmit it to the ONU, since an ONU does not use an IP address in a PON. The DHCP configuration file also includes an ONU configuration file name—actually a file name for the CM corresponding to the ONU 29 attempting to register—and the IP address of TFTP server 20 where the ONU/CM configuration file resides. QMF 34 then downloads the configuration file for the ONU 29 that is attempting to register via TFTP using it's (QMF's) own IP address. When the configuration file is received, QMF 34 parses the DOCSIS classifiers, subscriber management filters and service flow QoS parameter TLVs. QMF 34 then translates the information corresponding to these various DOCSIS parameters into ONU Logical Link Identifier (LLID) QoS parameters and sends them via a control interface to OLT 26. OLT 26 then performs its own configuration dialog, or messaging, with the target ONU 29, thus registering the ONU according to OLT LLID QoS parameters. OLT 26 then dynamically manages the bandwidth between the ONU and itself based on these LLID QoS parameters without further control from QMF 34. At this point Ethernet packets may transit the data plane between the MAC domain of processor portion 9 and the ONU 29 via the OLT 26 data plane interface.

Since the QMF 34 acts as a DHCP proxy client for ONU 29 and the ONU does not have its own IP address, the QMF therefore becomes the management control point for the ONU to the rest of the operator's back office systems coupled to IP network 10 shown in FIG. 2. Thus, the QMF 34 performs several management functions normally performed by a CM itself. These functions include, but are not limited to:

A. The QMF DHCP proxy client 34 periodically renews the ONU's 29 management IP address lease with the DHCP server. This does not require interaction with the OLT 26. The IP address of ONU 29 is released if the OLT 26 reports the ONU is off-line.

B. The QMF 34 can perform an SNMP proxy agent function for the ONU 29 including support for DOCSIS MIBs and traps mapped via the OLT 26 control interface. Management stations address the SNMP proxy agent by the IP address associated with the ONU 29 as if it were the ONU itself. These packets are forwarded by CMTS 6 on the data plane towards the 29 and must be intercepted and responded to by the QMF 34 as the ONU cannot receive them. QMF 34 then maps the SNMP request or trap via the OLT 26 control interface and responds to the management system.

C. PacketCable 1.x and PacketCable Multimedia (PCMM) gate requests are forwarded by CMTS's 6 control plane to QMF 34 using the ONU's 29 MAC address or IP address. QMF 34 dynamically creates, modifies, and deletes ONU QoS parameters based on the gate requests via the OLT 26 control interface. This supports an ONU that has an embedded or standalone Multimedia Terminal Adapter (MTA) attached.

Figure 3:
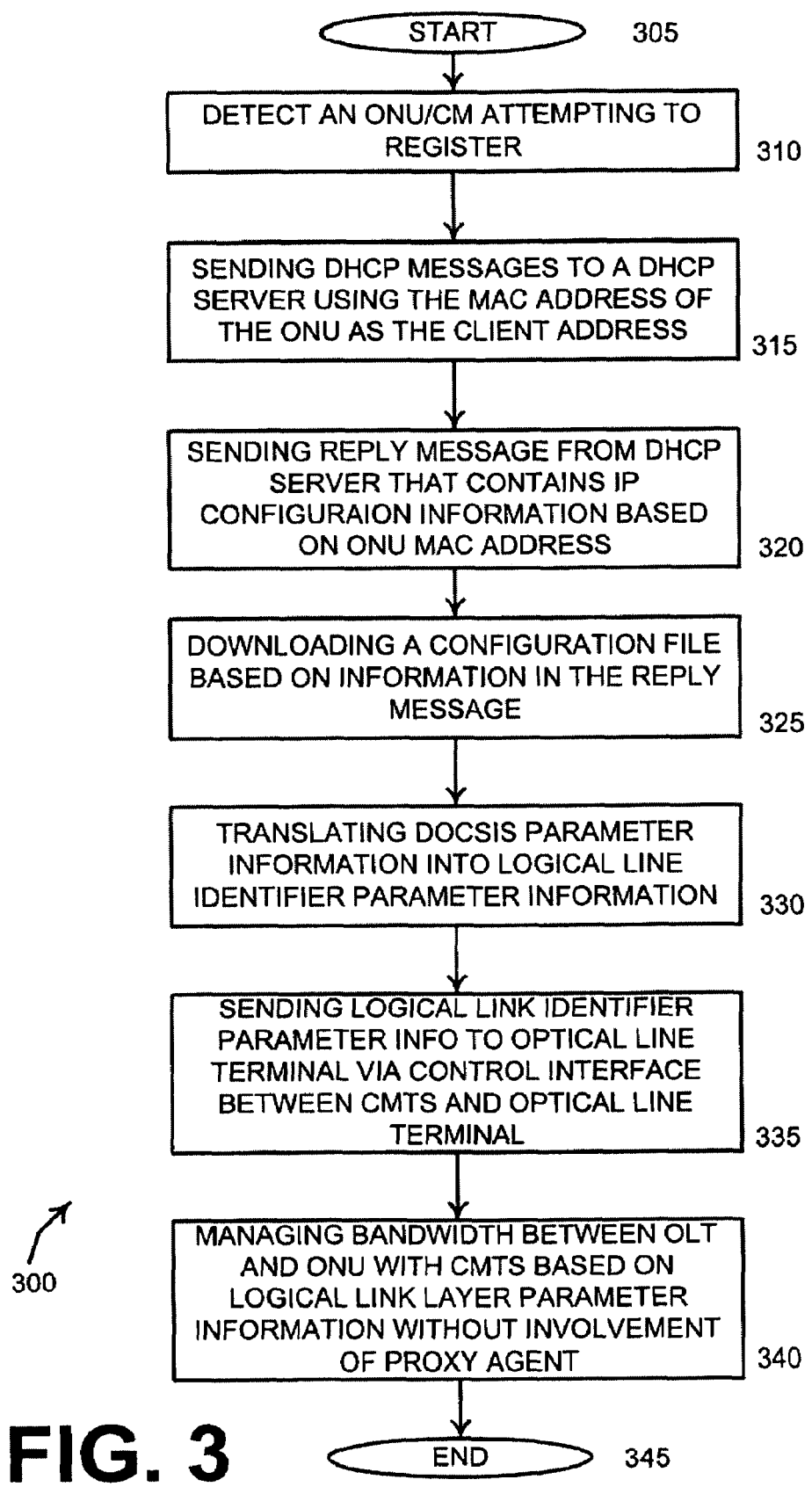
FIG. 3 illustrates a flow diagram of a method for transporting DOCSIS communication signals over a PON.

FIG. 3 illustrates some of the aspects described above. Method 300 starts at step 305. Equipment at an MSO's head end detects that an ONU and associated CM is attempting to register at step 310. A CM, or TTM, for example, at a customer's premises attempts to register with a CMTS according to the DOCSIS standard. However, its signal is forwarded to the PON through an ONU to which it is coupled. The ONU does not typically have an IP address. An OLT at the head end, which is the interface to the optical network for the CMTS, receives messages and information from the ONU and sends them to the CMTS (MAC domain layer). At step 315, a Quality of Service ("QoS") mapping function, or agent as referred to herein, sends DHCP discovery and request messages to a DHCP server using the MAC address of the ONU as the client address in messages. The QoS mapping agent sends the DHCP messages on behalf of the CPE device attempting to register with the CMTS.

In response to the DHCP discovery and request messages, the DHCP server sends reply messages, typically offer and acknowledge messages, at step 320. The messages sent at step 320 typically contain IP configuration information that has been previously associated with the MAC address of the ONU, which is associated with the CPE device attempting to register. It will be appreciated that steps 315 and 320 may be performed out of order inasmuch as in a typical DHCP IP setup operation, the client device, in the present case the CPE device, sends the discovery message toward the DHCP server, which it turn may respond with an offer message. The client device then sends a request message and the DHCP server responds with an acknowledge message to the client. However, for purposes of illustration, the drawing represents messages sent from the client as step 315 and messages sent from the DHCP server as step 320.

After steps 315 and 320 have occurred, the QoS mapping agent downloads a configuration and setup information regarding the CPE device requesting access as step 325. The configuration information includes DOCSIS parameter information in a format that that an ONU does not recognize or act upon. Thus, the QoS mapping agent converts, or maps, the DOCSIS parameters to logical link identifier parameter information at step 330. The QoS mapping agent then directs that the CMTS send the logical link identifier parameter information to the OLT at step 335. The logical link identifier parameter information sent via a control interface that exists between the CMTS and the OLT. For the rest of the session between the CM/ONU and the CMTS/OLT, the CMTS manages the bandwidth usage between the ONU and OLT based on the logical link layer parameters without involvement of the QoS mapping agent at step 340. Method 300 ends at step 345.

What is claimed is:

1. A method for transporting DOCSIS information over a passive optical network, comprising:
   identifying a optical network unit associated with a customer premise device that is attempting to register with a CMTS, wherein the customer premise device interfaces with the PON via the optical network unit and the CMTS interfaces with the PON via an optical line terminal;
   sending DHCP discovery and request messages to a DHCP server, wherein the MAC address of the optical network unit associated with the customer premise device attempting to register is used in a client address field in the discovery and request messages; and
   sending a reply message from the DHCP server that contains IP configuration information based on the MAC address of the optical network unit associated with the CPE attempting to register, wherein the reply message from the DHCP server comprises:
      a management IP address for the optical network unit associated with the customer premise equipment device attempting to register;
      a name of a configuration file associated with the optical network unit associated the customer premise equipment device attempting to register; and
      an IP address of a TFTP server where a configuration file associated with the customer premise equipment device attempting to register is stored.

2. The method of claim 1 further comprising downloading the configuration file from the TFTP server to the CMTS using the management IP address for the ONU contained in the reply message as the address of the QMF agent.

3. The method of claim 2, further comprising:
   evaluating DOCSIS parameters in the TFTP configuration file with the QMF agent;
   translating the DOCSIS parameter information into logical link identifier parameter information with the QMF agent;
   sending the logical link layer parameter information to the optical line terminal via a logical control interface between the CMTS and the optical line terminal; and
   managing bandwidth between the optical network unit and the optical line terminal based on the logical link layer parameter information without further involvement or the QMF agent operated by the CMTS.

4. A method for transporting DOCSIS information over a passive optical network, comprising:
   identifying a optical network unit associated with a customer premise device that is attempting to register with a CMTS, wherein the customer premise device interfaces with the PON via the optical network unit and the CMTS interfaces with the PON via an optical line terminal;
   sending DHCP discovery and request messages to a DHCP server, wherein the MAC address of the optical network unit associated with the customer premise device attempting to register is used in a client address field in the discovery and request messages;
   sending a reply message from the DHCP server that contains IP configuration information based on the MAC address of the optical network unit associated with the CPE attempting to register;
   downloading the configuration file from the TFTP server to the CMTS using the management IP address for the ONU contained in the reply message as the address of the QMF agent;
   evaluating DOCSIS parameters in the TFTP configuration file with the QMF agent;
   translating the DOCSIS parameter information into logical link identifier parameter information with the QMF agent;
   sending the logical link layer parameter information to the optical line terminal via a logical control interface between the CMTS and the optical line terminal; and
   managing bandwidth between the optical network unit and the optical line terminal based on the logical link layer parameter information without further involvement of the QMF agent operated by the CMTS.

5. The method of claim 4 wherein the reply message from the DHCP includes:
   a management IP address for the optical network unit associated with the customer premise equipment device attempting to register;
   a name of a configuration file associated with the optical network unit associated the customer premise equipment device attempting to register; and
   an IP address of a TFTP server where a configuration file associated with the customer premise equipment device attempting to register is stored.

* * * * *